United States Patent
Dor et al.

(10) Patent No.: US 7,502,899 B2
(45) Date of Patent: Mar. 10, 2009

(54) WRITE SET BOUNDARY MANAGEMENT IN SUPPORT OF ASYNCHRONOUS UPDATE OF SECONDARY STORAGE

(75) Inventors: Shira Ben Dor, Givat Shmuel (IL); Amir Kredi, Tel Aviv-Jaffa (IL); Aviad Zlotnick, Galil Tachton (IL); Henry Butterworth, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 11/093,584

(22) Filed: Mar. 30, 2005

(65) Prior Publication Data

US 2005/0240808 A1   Oct. 27, 2005

(30) Foreign Application Priority Data

Mar. 31, 2004   (GB)   ................ 0407257.5

(51) Int. Cl.
*G06F 12/00*   (2006.01)
*G06F 13/00*   (2006.01)
*G06F 13/28*   (2006.01)
*G06F 15/167*   (2006.01)
*G06F 15/16*   (2006.01)

(52) U.S. Cl. .............. 711/154; 711/141; 711/147; 711/161; 711/162; 709/213; 709/216; 709/217; 709/218; 709/219

(58) Field of Classification Search .............. None
See application file for complete search history.

(56) References Cited

U.S. PATENT DOCUMENTS

| | | | | |
|---|---|---|---|---|
| 5,592,618 | A | * | 1/1997 | Micka et al. ............ 714/54 |
| 5,720,029 | A | * | 2/1998 | Kern et al. ............. 714/20 |
| 6,654,766 | B1 | * | 11/2003 | Degenaro et al. ...... 707/104.1 |

* cited by examiner

*Primary Examiner*—Stephen C Elmore
*Assistant Examiner*—Marwan Ayash
(74) *Attorney, Agent, or Firm*—Vazken Alexanian

(57) ABSTRACT

Methods, systems and apparatus for maintaining colors and color boundaries across multiple storage controllers by instructing a polling storage controller to poll a color control node for current color information, changing the current color to a new color, and instructing the polling storage controller to cease polling the color control node for the current color information.

2 Claims, 3 Drawing Sheets

WRITE SET BOUNDARY MANAGEMENT IN SUPPORT OF ASYNCHRONOUS UPDATE OF SECONDARY STORAGE

FIELD OF THE INVENTION

The present invention relates to disaster recovery strategies for computer systems in general, and more particularly to write set boundary management in support of asynchronous update of secondary storage.

BACKGROUND OF THE INVENTION

Disaster recovery strategies for computer systems generally involve copying data stored at a primary site to a secondary site which is typically located some distance from the primary site. Copying from the primary copy to the secondary copy may be performed either synchronously or asynchronously. Where copying is performed synchronously, each time an update is written to the primary copy, the update is also sent to the secondary site to be written to the secondary copy. Only after the secondary site informs the primary site that the secondary copy has been updated does the primary site acknowledge the update to the primary copy and stand ready to write the next update. Thus, updates are written to the primary and secondary copies in the same order. Where copying is performed asynchronously, multiple updates may be written to the primary copy and acknowledged before any updates are sent to the secondary site, as the primary copy is maintained independently from the secondary copy. The updates are sent periodically to the secondary site, typically as a set of writes referred to herein as a "color," and are written to the secondary copy, not necessarily in the same order as they were written to the primary copy.

Where a single color is maintained across multiple storage controllers at the primary site, it is necessary when switching to the next color that all storage controllers switch to the next color in a coordinated fashion to maintain the integrity of "dependent writes" across color boundaries. For example, given the following typical sequence of dependent writes for a data base update transaction:
1. execute a write to update the data base log indicating that a data base update is about to take place, then
2. execute a second write to update the data base, and finally
3. execute a third write to update the data base log indicating that the data base update has completed successfully, it is imperative that these dependent writes either all belong to the same color, or, if they cross a color boundary, that the earlier write(s) belong to the old color and the later write(s) belong to the new color. In this example, assuming writes 1, 2, and 3 are each written by a different storage controller, if writes 1 and 3 are written as part of color group "red," and write 2 is written as part of the next color group "blue," should the primary copy be lost after the "red" group is written to the secondary copy but before the "blue" group is written to the secondary copy, the data base log in the secondary copy would incorrectly show that the second write to update the data base occurred, when in fact the data base was never updated.

In one technique for maintaining colors and color boundaries across multiple storage controllers at the primary site, before associating a write with a color, each storage controller polls a color control node which maintains the current color and requests the current color. The color control node apprises the storage controller of the current color, and the storage controller associates the write with that color. While this ensures the absolute color switchover of all storage controllers at effectively the same point in time and thereby ensures that the integrity of dependent writes is maintained across the color boundary, each write operation is delayed by the round trip to the color control node, and the color control node might become a bottleneck.

A method for maintaining colors and color boundaries across multiple storage controllers at the primary site that reduces write delay and the risk of bottleneck would therefore be advantageous.

SUMMARY OF THE INVENTION

The present invention discloses a system and method for write set boundary management in support of asynchronous update of secondary storage. In one aspect of the present invention a method is provided for maintaining colors and color boundaries across multiple storage controllers, the method including a) instructing a polling storage controller to poll a color control node for current color information, b) changing the current color to a new color, and c) instructing the polling storage controller to cease polling the color control node for the current color information.

In another aspect of the present invention a method is provided for maintaining colors and color boundaries across multiple storage controllers, the method including configuring a polling storage controller to maintain a current color and associate all writes with the current color without polling a color control node for current color information prior to receiving an instruction to poll, configuring the polling storage controller to poll the color control node for the current color information subsequent to receiving the instruction to poll, and configuring the polling storage controller to establish a new color as the current color and associate all writes with the new-and-now-current color without polling the color control node for the current color information subsequent to receiving an instruction to cease polling.

In another aspect of the present invention a color control node is provided operative to a) instruct a polling storage controller to poll the color control node for current color information, b) change the current color to a new color, and c) instruct the polling storage controller to cease polling the color control node for the current color information.

In another aspect of the present invention a polling storage controller is provided operative to maintain a current color and associate all writes with the current color without polling a color control node for current color information prior to receiving an instruction to poll, poll the color control node for the current color information subsequent to receiving the instruction to poll, and establish a new color as the current color and associate all writes with the new-and-now-current color without polling the color control node for the current color information subsequent to receiving an instruction to cease polling.

In another aspect of the present invention a system is provided for maintaining colors and color boundaries across multiple storage controllers, the system including a color control node operative to a) instruct a polling storage controller to poll the color control node for current color information, b) change the current color to a new color, and c) instruct the polling storage controller to cease polling the color control node for the current color information, and a polling storage controller operative to maintain a current color and associate all writes with the current color without polling the color control node for the current color information prior to receiving an instruction to poll, poll the color control node for the current color information subsequent to receiving the instruction to poll, and establish a new color as the current color and associate all writes with the new-and-now-current color without polling the color control node for the current color information subsequent to receiving an instruction to cease polling.

In another aspect of the present invention a method is provided for deploying a redundant storage system, the method including installing a color control node at a primary data storage site, the color control node operative to a) instruct a polling storage controller to poll the color control node for current color information, b) change the current color to a new color, and c) instruct the polling storage controller to cease polling the color control node for the current color information, and installing a polling storage controller at the primary data storage site, the polling storage controller operative to maintain a current color and associate all writes with the current color without polling the color control node for the current color information prior to receiving an instruction to poll, poll the color control node for the current color information subsequent to receiving the instruction to poll, and establish a new color as the current color and associate all writes with the new-and-now-current color without polling the color control node for the current color information subsequent to receiving an instruction to cease polling.

BRIEF DESCRIPTION OF THE DRAWINGS

The present invention will be understood and appreciated more fully from the following detailed description taken in conjunction with the appended drawings, in which.

DETAILED DESCRIPTION OF PREFERRED EMBODIMENTS

Figure 1:
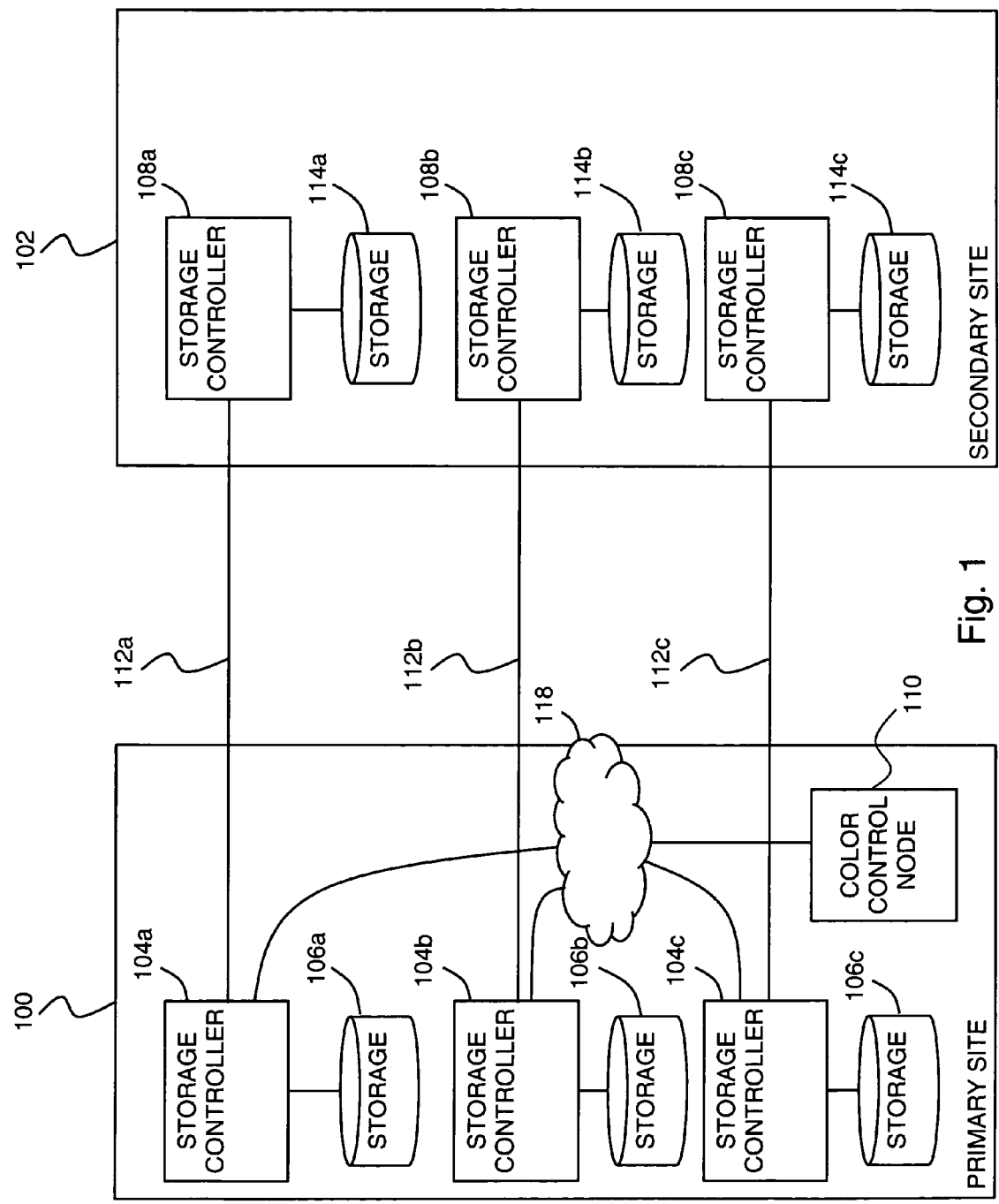
FIG. 1 is a simplified block diagram illustration of an example of a system of primary and secondary data storage, constructed and operative in accordance with a preferred embodiment of the present invention.

The present invention provides a system and method for write set boundary management in support of asynchronous update of secondary storage. In an example embodiment of the present invention a method is provided for maintaining colors and color boundaries across multiple storage controllers, the method including a) instructing a polling storage controller to poll a color control node for current color information, b) changing the current color to a new color, and c) instructing the polling storage controller to cease polling the color control node for the current color information.

The present invention provides an embodiment wherein the instructing step c) includes informing the polling storage controller of the new color.

The present invention provides an embodiment wherein the method further includes configuring the polling storage controller to maintain the current color and associate all writes with the current color without polling color control node for the current color information prior to receiving the instruction to poll.

The present invention provides an embodiment wherein the method further includes configuring the polling storage controller to establish the new color as the current color and associate all writes with the new-and-now-current color without polling color control node for the current color information subsequent to receiving the instruction to cease polling.

The present invention provides an embodiment of a method for maintaining colors and color boundaries across multiple storage controllers, the method including configuring a polling storage controller to maintain a current color and associate all writes with the current color without polling a color control node for current color information prior to receiving an instruction to poll, configuring the polling storage controller to poll the color control node for the current color information subsequent to receiving the instruction to poll, and configuring the polling storage controller to establish a new color as the current color and associate all writes with the new-and-now-current color without polling the color control node for the current color information subsequent to receiving an instruction to cease polling.

The present invention provides an embodiment wherein the method further includes instructing the polling storage controller to poll the color control node for the current color information.

The present invention provides an embodiment wherein the method further includes changing the current color to a new color subsequent to instructing the polling storage controller to poll the color control node for the current color information.

The present invention provides an embodiment wherein the method further includes informing the polling storage controller of the new color subsequent to instructing the polling storage controller to poll the color control node for the current color information.

The present invention provides an embodiment wherein the method further includes instructing the polling storage controller to cease polling the color control node for the current color information.

The present invention provides an embodiment wherein a color control node is provided operative to a) instruct a polling storage controller to poll the color control node for current color information, b) change the current color to a new color, and c) instruct the polling storage controller to cease polling the color control node for the current color information.

The present invention provides an embodiment wherein the color control node is further operative to inform the polling storage controller of the new color.

The present invention provides an embodiment wherein the color control node is further including a polling storage controller operative to maintain the current color and associate all writes with the current color without polling color control node for the current color information prior to receiving the instruction to poll.

The present invention provides an embodiment wherein the color control node further includes a polling storage controller operative to establish the new color as the current color and associate all writes with the new-and-now-current color without polling color control node for the current color information subsequent to receiving the instruction to cease polling.

The present invention provides an embodiment wherein a polling storage controller is provided operative to maintain a current color and associate all writes with the current color without polling a color control node for current color information prior to receiving an instruction to poll, poll the color control node for the current color information subsequent to receiving the instruction to poll, and establish a new color as the current color and associate all writes with the new-and-now-current color without polling the color control node for the current color information subsequent to receiving an instruction to cease polling.

The present invention provides an embodiment wherein the polling storage controller is further operative to instruct the polling storage controller to poll the color control node for the current color information.

The present invention provides an embodiment wherein the polling storage controller is further operative to change the current color to a new color subsequent to instructing the polling storage controller to poll the color control node for the current color information.

The present invention provides an embodiment wherein the polling storage controller is further operative to inform the polling storage controller of the new color subsequent to instructing the polling storage controller to poll the color control node for the current color information.

The present invention provides an embodiment wherein the polling storage controller is further operative to instruct the polling storage controller to cease polling the color control node for the current color information.

The present invention provides an embodiment wherein a system is provided for maintaining colors and color boundaries across multiple storage controllers, the system including a color control node operative to a) instruct a polling storage controller to poll the color control node for current color information, b) change the current color to a new color, and c) instruct the polling storage controller to cease polling the color control node for the current color information, and a polling storage controller operative to maintain a current color and associate all writes with the current color without polling the color control node for the current color information prior to receiving an instruction to poll, poll the color control node for the current color information subsequent to receiving the instruction to poll, and establish a new color as the current color and associate all writes with the new-and-now-current color without polling the color control node for the current color information subsequent to receiving an instruction to cease polling.

The present invention provides an embodiment wherein a method is provided for deploying a redundant storage system, the method including installing a color control node at a primary data storage site, the color control node operative to a) instruct a polling storage controller to poll the color control node for current color information, b) change the current color to a new color, and c) instruct the polling storage controller to cease polling the color control node for the current color information, and installing a polling storage controller at the primary data storage site, the polling storage controller operative to maintain a current color and associate all writes with the current color without polling the color control node for the current color information prior to receiving an instruction to poll, poll the color control node for the current color information subsequent to receiving the instruction to poll, and establish a new color as the current color and associate all writes with the new-and-now-current color without polling the color control node for the current color information subsequent to receiving an instruction to cease polling.

The present invention provides an embodiment wherein a computer program is provided embodied on a computer-readable medium, the computer program including a first code segment operative to instruct a polling storage controller to poll a color control node for current color information, a second code segment operative to change the current color to a new color, and a third code segment operative to instruct the polling storage controller to cease polling the color control node for the current color information.

The present invention provides an embodiment wherein a computer program is provided embodied on a computer-readable medium, the computer program including a first code segment operative to maintain a current color and associate all writes with the current color without polling a color control node for the current color information prior to receiving an instruction to poll, a second code segment operative to poll the color control node for the current color information subsequent to receiving the instruction to poll, and a third code segment operative to establish a new color as the current color and associate all writes with the new-and-now-current color without polling the color control node for the current color information subsequent to receiving an instruction to cease polling.

It is appreciated throughout the specification and claims that references to polling to receive the current color may refer to receiving color information using any known information representation technique, including where the color is expressed in numeric form, such as a serial number that is associated with a color.

Reference is now made to FIG. 1, which is a simplified block diagram illustration of a system of primary and secondary data storage, constructed and operative in accordance with a preferred embodiment of the present invention. In the system of FIG. 1, a primary site 100 includes storage controllers 104*a*, 104*b*, and 104*c*, coupled to storage systems 106*a*, 106*b*, and 106*c*, respectively. Storage controllers 104*a*, 104*b*, and 104*c* manage Input/Output (I/O) access to volumes in storage systems 106*a*, 106*b*, 106*c* from host systems (not shown). Storage controllers 104*a*, 104*b*, and 104*c* are preferably configured to copy data to corresponding remote storage controllers 108*a*, 108*b*, and 108*c* at a secondary site 102 via connections 112*a*, 112*b*, and 112*c*. Storage controllers 104*a*, 104*b*, and 104*c* preferably periodically transmit sets of data writes, referred to herein as "colors," to the remote storage controllers 108*a*, 108*b*, and 108*c*, in accordance with conventional techniques, where the remote storage controllers 108*a*, 108*b*, and 108*c* write the data to their respective attached storage systems 114*a*, 114*b*, and 114*c*. Although FIG. 1 illustrates a certain number of components at sites 100 and 102, such as three storage controllers and storages each, it is appreciated that any number of storage controllers and storage systems may be used.

Secondary site 102 may be hundreds or thousands of miles from the primary site 100. The connections 112*a*, 112*b*, 112*c* between pairs of storage controllers may comprise a dedicated line, such as a dedicated fiber optical network or connection maintained by a long distance telecommunication carrier, long distance fiber optic connection having channel extenders, or extend through a network, such as a Storage Area Network (SAN), Primary Area Network (LAN), or the Internet.

Host systems (not shown) at primary site 100 may perform Input/Output (I/O) operations with respect to volumes in the storage systems 106*a*, 106*b*, and 106*c*. The host systems may communicate with storage controllers 104*a*, 104*b*, and 106*c* via any network or connection known in the art.

Storage controllers 104*a*, 104*b*, 104*c*, 108*a*, 108*b*, and 108*c* preferably include a processor complex and may comprise any storage controller or server known in the art, such as the IBM Enterprise Storage Server (ESS®), 3990 Storage Controller. Storage systems 106*a*, 106*b*, 106*c*, 104*a*, 114*b*, and 114*c* may comprise an array of storage devices, such as a Just a Bunch of Disks (JBOD) or a Redundant Array of Independent Disks (RAID) array.

Each storage controller 104*a*, 104*b*, and 104*c* at primary site 100 preferably communicates, via a network 118, with a color control node 110 which maintains the current color. Prior to associating a write with a color, each storage controller 104*a*, 104*b*, and 104*c* polls color control node 110 and requests the current color. Color control node 110 apprises the requesting storage controller of the current color, and the storage controller associates the write with that color in accordance with conventional techniques.

Figure 2:
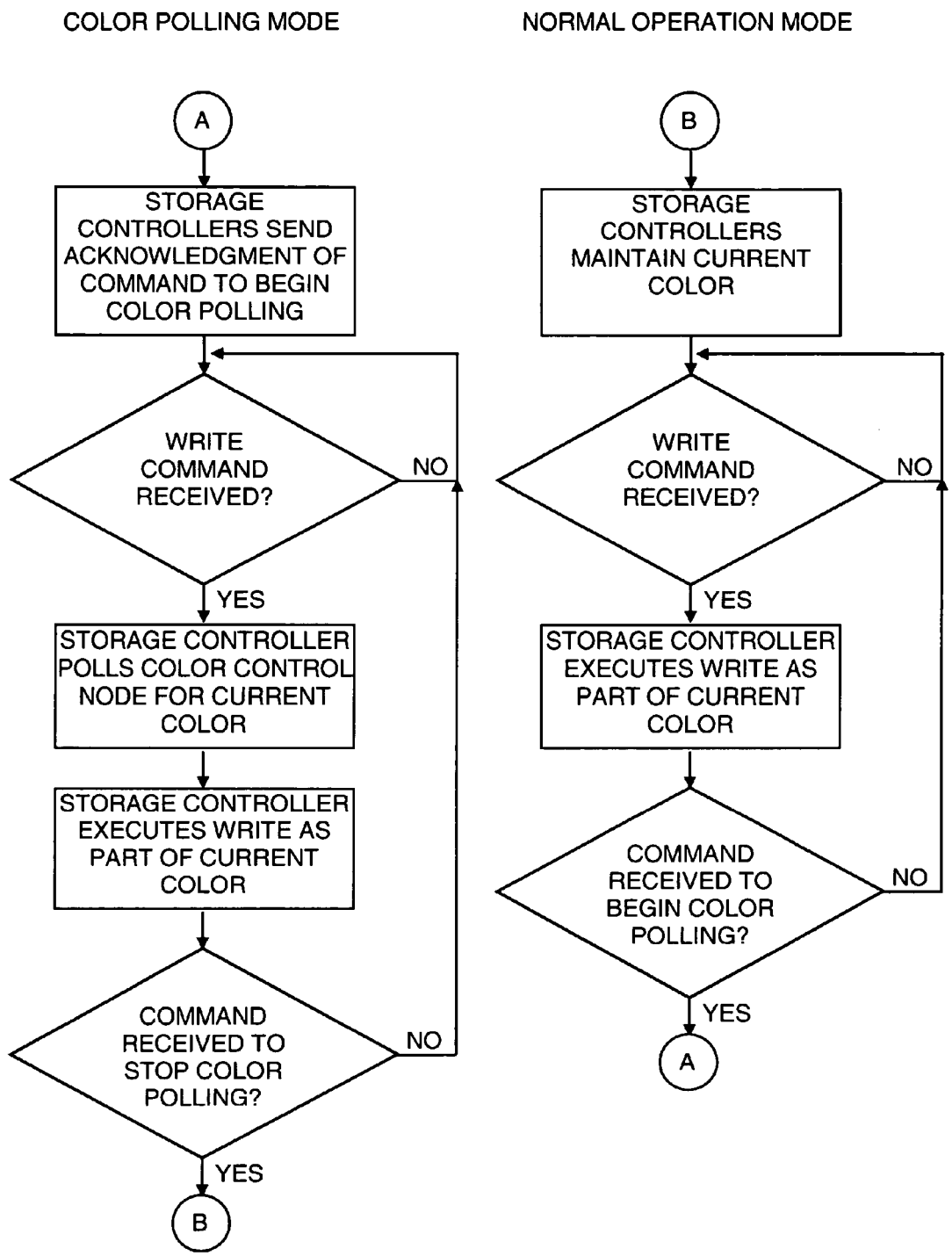
FIGS. 2 and 3 are simplified flowchart illustrations of an example of a method for maintaining colors and color boundaries across multiple storage controllers, operative in accordance with a preferred embodiment of the present invention.
Figure 3:
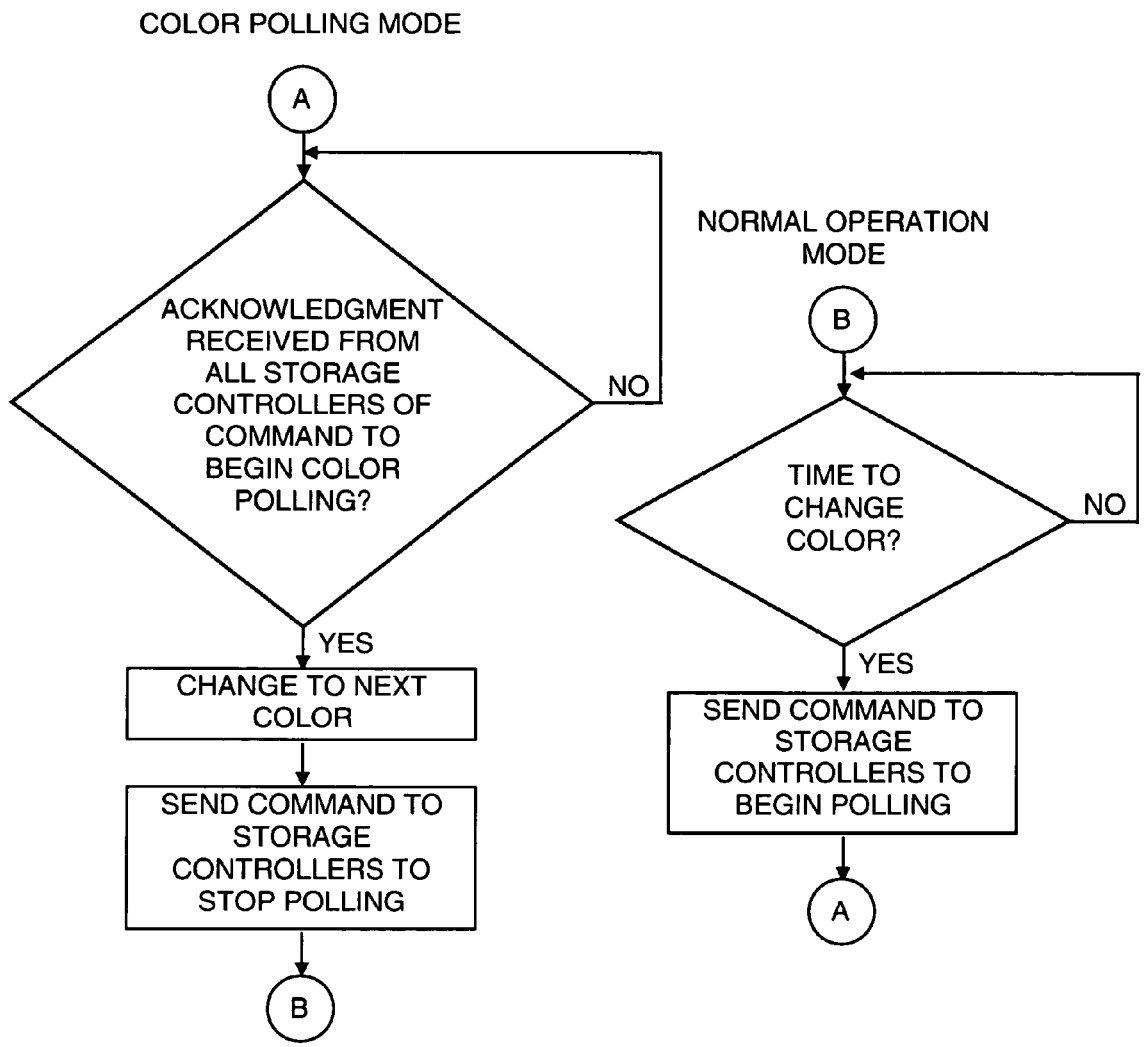

Reference is now made to FIGS. 2 and 3, which are simplified flowchart illustrations of a method for maintaining colors and color boundaries across multiple storage controllers, operative in accordance with a preferred embodiment of the present invention. The method of FIGS. 2 and 3 may be understood with reference to the primary and secondary data storage system of FIG. 1, where the method of FIG. 2 is preferably implemented by storage controllers 104a, 104b, and 104c, and the method of FIG. 3 is preferably implemented by color control node 110. In the method of FIGS. 2 and 3, which may be understood with reference to the primary and secondary data storage system of FIG. 1, primary site 100 operates in either of two modes: a normal operation mode and a color polling mode. During normal operation, each storage controller 104a, 104b, and 104c at primary site 100 maintains the current color and associates all writes with that color without polling color control node 110. Just prior to switching to a new color, such as in accordance with a predefined schedule, primary site 100 reverts to color polling mode with color control node 110 issuing a command to storage controllers 104a, 104b, and 104c to poll color control node 110 for the current color prior to associating each write with a color. Each of storage controllers 104a, 104b, and 104c send an acknowledgment of receipt of the command to color control node 110. Once color control node 110 receives an acknowledgment from each of storage controllers 104a, 104b, and 104c, color control node 110 changes to the new color. Color control node 110 then issues a command to storage controllers 104a, 104b, and 104c indicating the new color and instructing storage controllers 104a, 104b, and 104c to stop polling color control node 110 for the current color. Primary site 100 then reverts to normal operation mode, with storage controllers 104a, 104b, and 104c establishing and maintaining the new color as the current color and associating all writes with the new-and-now-current color without polling color control node 110.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

The present invention can be realized in hardware, software, or a combination of hardware and software. The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for maintaining colors and color boundaries across multiple storage controllers, said method comprising:
   employing a plurality of storage controllers, a primary data storage system at a primary site and a secondary data storage system at a secondary site;
   said primary data storage system operating in either of two modes: a normal operation mode and a color polling mode;
   when said primary data storage system is operating in said normal operation mode, each storage controller at said primary site maintaining a current color and associating all writes with said current color without polling a color control node;
   just prior to switching to a new color, said primary site reverting to said color polling mode with said color control node issuing a polling command to said plurality of storage controllers to poll said color control node for the current color prior to associating each write with a new color;
   each storage controller from said plurality of storage controllers sending an acknowledgment of receipt of the polling command to color control node;
   upon said color control node receiving an acknowledgment from said each storage controller, said color control node changing to the new color;
   said color control node issuing a storage command to storage controllers indicating the new color and instructing said each storage controller to stop polling color control node for the current color;
   said primary site reverting to normal operation mode, with said plurality of storage controllers establishing and maintaining the new color as a new-and-now-current color and associating all writes with the new-and-now-current color without polling color control node.

2. A method as recited in claim 1, wherein the step of switching to a new color is in accordance with a predefined schedule.

* * * * *